March 28, 1961
D. H. PUTNEY
2,977,397
HYDROGEN FLUORIDE ALKYLATION WITH EFFLUENT REFRIGERATION
Filed March 30, 1959
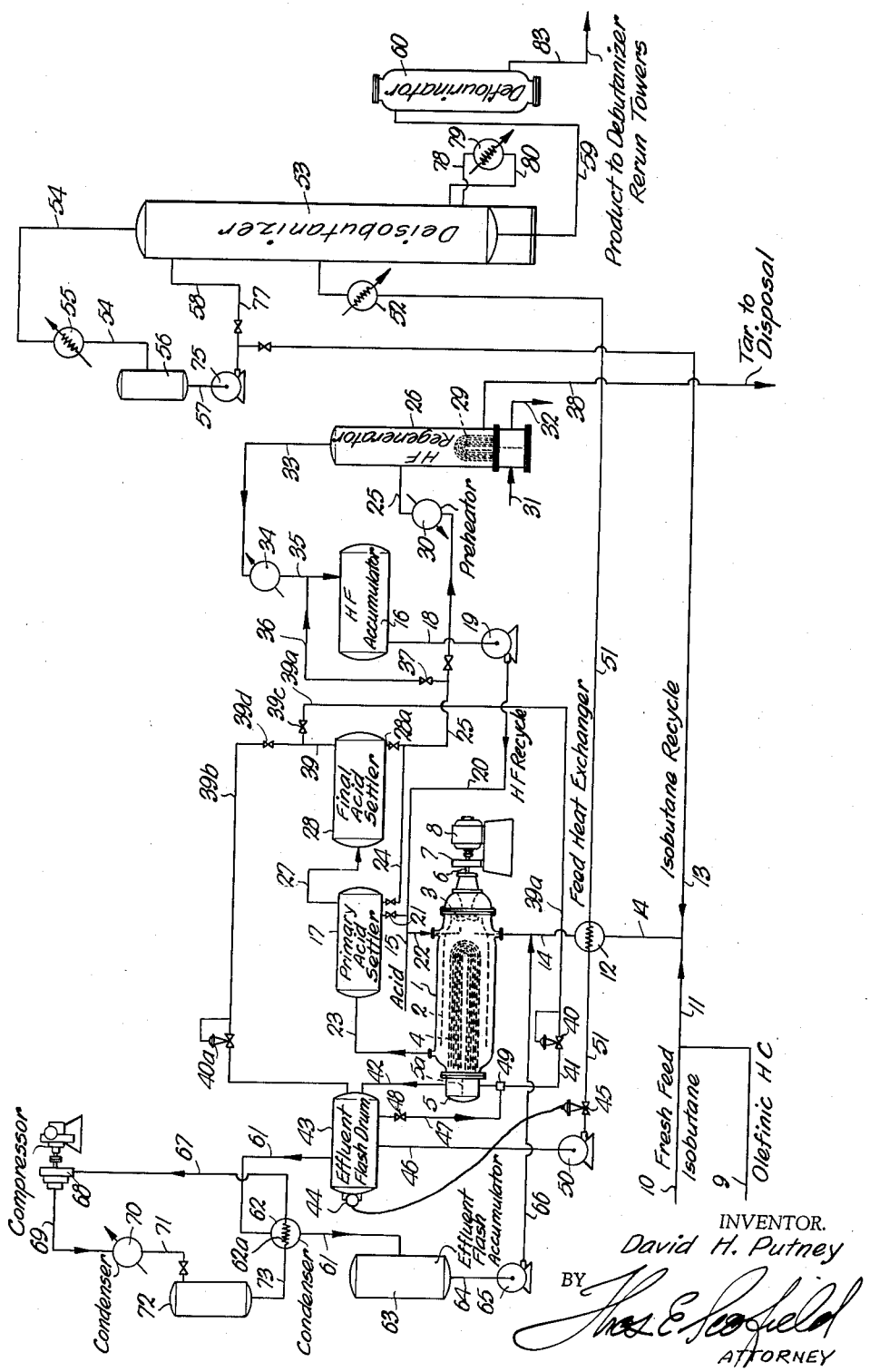
INVENTOR.
David H. Putney
BY
ATTORNEY United States Patent Office 2,977,397
Patented Mar. 28, 1961

2,977,397

HYDROGEN FLUORIDE ALKYLATION WITH EFFLUENT REFRIGERATION

David H. Putney, Kansas City, Kans., assignor to Stratford Engineering Corporation, Kansas City, Mo., a corporation of Delaware Filed Mar. 30, 1959, Ser. No. 802,908

2 Claims. (Cl. 260—683.48)

This invention relates to the alkylation of isoparaffinic hydrocarbons with olefinic hydrocarbons and refers more particularly to such an alkylation process wherein the catalyst employed is hydrogen fluoride.

This application is a continuation-in-part of my copending application, Serial No. 565,081, filed February 13, 1956, entitled "Hydrogen Fluoride Alkylation With Effluent Refrigeration." This application abandoned April 10, 1959.

It is conventional in the art of hydrogen fluoride catalyzed alkylation to mix the catalyst and the hydrocarbons to be alkylated in a reaction step and then pass from the reaction step to an acid settling stage from which is taken a hydrocarbon phase effluent usually containing approximately 0.5 to 1.5 percent by weight of the hydrogen fluoride catalyst. The history of this art discloses three alternative methods of handling such hydrocarbon phase effluent containing residual hydrogen fluoride. In one modification of the process, the hydrocarbon phase effluent was passed directly from the acid settling stage or stages to a neutralization tower to neutralize the hydrogen fluoride. From the neutralization tower, the neutralized effluent was passed to the deisobutanizer tower. This variation of the process, however, was objectionable because there was too much residual acid to neutralize in the hydrocarbon phase.

In a second variation, the hydrocarbon phase effluent from the acid settling stage was passed directly to the deisobutanizer, the overhead containing most of the HF being returned to the reactor and the bottoms only being sent to neutralization. This proved to be excessively hard on the deisobutanizer tower, because the HF in the overhead being more than the saturation quantity was largely free HF and very corrosive. Finally, in a common conventional variation of the process, the hydrogen fluoride containing hydrocarbon phase effluent is passed from the acid settling stage to an alloy stripper and from thence to the deisobutanizer. This process provides the advantageous condition of no free hydrogen fluoride in the deisobutanizer at the cost of providing the expensive alloy stripper.

Additionally, none of the three variations of hydrogen fluoride alkylation was able to achieve the advantages of effluent refrigeration of the reaction step as set forth relative sulfuric acid alklation in the Putney Patent 2,664,452, issued December 29, 1953; Serial No. 450,192, now U.S. Patent No. 2,949,494, David H. Putney, filed August 16, 1954, "Alkylation of Hydrocarbons Utilizing Evaporative Cooling"; and Serial No. 565,090, David H. Putney, filed February 13, 1956, "Effluent Refrigeration" and now abandoned.

Therefore, an object of the invention is to provide an alkylation system catalyzed by hydrogen fluoride wherein the alloy stripper is eliminated from the system yet no free hydrogen fluoride is present in the hydrocarbon phase effluent passed to the deisobutanizer.

Another object of the invention is to provide an alkylation system catalyzed by hydrogen fluoride which requires no alloy stripper and yet passes substantially hydrogen fluoride free hydrocarbon phase effluent to the deisobutanizer while, additionally, achieving the benefits of effluent refrigeration for the alkylation system.

Another object of the invention is to provide an alkylation system catalyzed by hydrogen fluoride wherein the hydrogen fluoride is separated from the hydrocarbon phase effluent at low non-corrosive temperatures without passing through an alloy stripper, the hydrogen fluoride so removed recycled to the reaction step as a feed constituent without damaging any equipment in the alkylation system.

Other and further objects of the invention will appear in the course of the following description thereof.

In the accompanying drawing which forms a part of the specification and is to be read in conjunction therewith, a schematic flow diagram of one embodiment of the invention is shown.

Reaction and acid settling

Referring to the drawings, at 1 is shown the shell of a reactor equipped with an open-ended circulating tube 2. At one end of the circulating tube is an impeller 3 which serves the purpose of a circulating pump in cooperation with the circulating tube. Within the circulating tube 2 are a plurality of heat exchanger elements 4 comprising a tube bundle provided with a distributing head 5 enclosing one end of the reactor. The impeller 3 is mounted on a shaft 6 rotated through a reduction gear 7 by any suitable source of power or prime mover such as an electrical motor or stream turbine diagrammatically shown at 8.

Circulation within the reactor is established by the impeller through the annular space between the shell 1 and circulating tube 2 around the cooling or heat exchange tubes 4 and back to the impeller. The reaction can also be accomplished in a vessel without heat exchange elements with the heat exchange step in a subsequent operation, or in a vessel without internal circulation. Olefinic hydrocarbons and isobutane in excess are introduced to the system through lines 9 and 10, respectively, and are combined in feed pipe 11 prior to passage through heat exchanger 12. Recycled isobutane from fractionation is returned through pipe 13 and introduced into the hydrocarbon mixture before reaching the heat exchanger 12, constituting a portion of the feed supplied to the reactor through pipe 14.

Fresh acid is supplied to the system through line 15, being combined with recycle acid from accumulator 16 and acid bottoms from primary acid settler 17. The recycle acid is returned through line 18, pump 19 and line 20 while the bottoms from primary settler 17 are returned to the reactor through line 21. The fresh acid and recycle acid enter the reactor through pipe 22.

Hydrocarbons supplied through lines 9 and 10 combined with recycled isobutane are mixed in the reactor with the acid catalyst introduced through pipe 22. Alkylation of the isoparafinic hydrocarbons by the olefinic hydrocarbons takes place in the reactor while the mixture is being rapidly circulated and agitated by impeller 3 which assures mixing of the hydrocarbons and acid catalyst.

The effluent mixture of hydrocarbons and acid is discharged from the reactor through pipe 23, passing first to the primary acid settler 17 where it is permitted to separate into a hydrocarbon phase and an acid phase. The acid phase is withdrawn from the bottom and is either returned to the reactor through pipes 21 and 22 or diverted through pipes 24 and 25 to the acid regenerator 26. Valves are interposed in these lines to govern the amount of acid returned to the reactor and diverted to the regenerator.

The hydrocarbon phase separated in primary settler 17 is discharged from the top through pipe 27 into final acid settler 28. In the final settler, the effluent mixture of hydrocarbons is permitted to separate from whatever acid remains, approximately one percent by weight remaining in the hydrocarbon phase material, the acid bottoms being withdrawn through a discharge line 28a connected into the acid discharge pipe 25 through which the acid bottoms from the primary acid settler flow to the acid regenerator 26. The acid bottoms from settlers 17 and 28 pass through lines 24 and 25 to acid regenerator 28 which is equipped with heating coil 29. A preheater 30 is interposed in pipe 25 ahead of the regenerator. Input and discharge fluid lines 31 and 32 serve to circulate a heating medium through coil 29 in the bottom of the acid regenerator 26. Regenerated acid passes from the top of regenerator 26 through line 33, and after condensation at 34 is delivered through pipe 35 into acid accumulator 16. By-pass flow-line 36, controlled by valve 37 may be used to by-pass the regenerator 26 or divert a portion of the acid bottoms from the settlers 17 and 28 to accumulator 16. As previously suggested, acid from the accumulator 16 is returned through lines 18 and 20 to the reactor. Sludge and tars are removed from the bottom of the regenerator 26 through line 38 to suitable disposal.

Hydrocarbon phase effluent

The hydrocarbon phase effluent from the acid settling stage taken off through line 39 contains approximately 0.5 to 1.5 percent by weight of hydrogen fluoride, only a small portion of which is in solution and the balance free acid. If this material were passed directly to deisobutanizer 53, there would be a severe corrosion problem occasioned by the free acid at elevated temperature. Likewise, if a neutralization step were imposed between the acid settling stage and the deisobutanizer tower 53, there would be a severe neutralization problem. If an alloy stripper were interposed directly between the final acid settler and the deisobutanizer, there would be the expense of this equipment and, additionally, there would be no benefit derived in the way of effluent refrigeration from the hydrocarbon phase. The instant method contemplates three alternatives.

In the first alternative, the entire hydrocarbon phase effluent is passed through line 39b, pressure reduced at valve 40a and from thence passed at greatly increased velocity into effluent flash drum 43. Recycle of liquid through line 47, line 41, distributing head 5, tube bundle 4 and line 42 must be carried out until a flash vaporization equilibrium is reached in the vapor withdrawal step (at the existing temperatures and pressures) within flash drum 43 at which at least substantially all of the hydrogen fluoride carried over in the hydrocarbon phase is vaporized. As the equilibrium constants of the hydrogen fluoride and the hydrocarbon phase effluent are quite different, this is feasible. At typical conditions of temperature and pressure, the flash equilibrium constants for effluent hydrocarbons and hydrogen fluoride are as follows:

| Mole percent: | K values at 45° F. and 26.91 p.s.i.a. |
| --- | --- |
| 4.56 | $C_3$–3.129 |
| 67.58 | $iC_4$–1.100 |
| 15.77 | $nC_4$–.728 |
| 1.00 | $iC_5$–.156 |
| 8.06 | $C_6$ (plus)–.0045 |
| 3.03 | HF–40.600 |

The K value of a component X is the mole fraction of component X in the vapor phase divided by the mole fraction of component X in the liquid phase when both phases are in equilibrium. See Hydrofluoric Acid Alkylation, Phillips Petroleum Company, Chemical Products Department, Bartlesville, Oklahoma, 1946, at page 265. Also see Industrial and Engineering Chemistry of February 1946.

Eductor 49 would be omitted in such a process with a simple connection between lines 47 and 41. Circulation of liquid through the cooling tubes 4 in such case is effected by the gas lift effect of the vapors evolved within the tubes. It is absolutely necessary that the drum 43, lines 47 and 42, and tube bundle 4 be so sized and of such heat exchanging capacity relative a given reaction step that such flash vaporization equilibrium may be achieved.

The second modification of the invention contemplates the passage of a portion of the total hydrocarbon phase effluent from the acid settler 28 through line 39b to effluent flash drum 43 after pressure reduction at 40a with sufficient total hydrocarbon phase effluent, both liquid and vapor without separation, passed through line 39a, pressure reducing valve 40, line 41, distributing head 5, tube bundle 4 and line 42 to provide a flash vaporization equilibrium in the vapor withdrawal step at 43 at which at least substantially all hydrogen fluoride is vaporized. If an insufficient amount of hydrocarbon phase effluent is passed through line 39a to provide such equilibrium through tube bundle heat exchange, recycle of liquid from trap 43 through lines 47 and 42 through the tube bundle 4 and distributing head may be required to achieve the critical flash vaporization equilibrium. Such liquid will be educted as at 49 by the high velocity flow from line 41. The function of the eductor 49 is to utilize the energy of the high velocity stream of fluid passing through line 41 after pressure reduction at valve 40. This stream of hydrocarbons flowing at high velocity draws into pipe 41 liquid from the flash drum 43 through pipe 47.

The third modification of the inventive process contemplates the passage of the entire hydrocarbon phase effluent, including both liquid and vapor without separation, through line 39a, valve 40, line 41, and through the distributing head 5 and tube bundle 4 and line 42 into flash drum 43 whereby to achieve the critical flash vaporization equilibrium with substantially all hydrogen fluoride out. It is contemplated that, in such case, the recycle through lines 47 and 42 will be but rarely required. If the equilibrium is not reached, however, such recycle is employed preferably with eduction at 49.

Back pressure valves 40 and 40a are designed to hold sufficient back pressure on the reactor-settler system to prevent appreciable evaporation of the hydrocarbon components contained therein. A liquid level control 44 manipulating the valve 45 regulates the discharge of liquid from the effluent flash drum 43 through pipe 46.

Although hydrofluoric acid alkylation is usually carried out in the range of 60 to 100° F., in a system wherein a small amount of propane is also present and the reaction temperature is controlled at about 33° F. to 55° F., the back pressure maintained on the settler by valve 40 will be in the order of 40 p.s.i.g. to 100 p.s.i.g. Upon passing pressure reduction valve 40 or 40a, pressure upon the hydrocarbon passing into the cooling elements is reduced to the order of 0 p.s.i.g. to 10 p.s.i.g., causing a considerable portion of the lighter components of the effluent to vaporize, resulting in the cooling of the entire hydrocarbon phase. Depending upon the pressure established within the cooling elements of tube bundle of the reactor, the temperature of the hydrocarbon effluent phase will be reduced to a figure normally within the range of 15° F. to 30° F. by evaporative cooling, making it suitable for use as the cooling medium for the reaction.

The liquid withdrawn from the effluent flash drum 43 through pipe 46 is returned by pump 50 and pipe 51 to heat exchanger 12 where it is brought in heat exchange relation with the incoming feed stock supplied through pipe 14. From the heat exchanger, the liquid passes through line 51 and preheater 52 to deisobutanizer 53 where the isobutane is taken off overhead through pipe 54, passed through condenser 55 and the condensate collected in receiver 56. Condensate accumulated in receiver 56 may be either returned to the tower 53 by pump 57 and pipe 58 or returned in whole or in part by pump 57 and pipe 13 as isobutane recycle. The alkylate product is recovered from the bottom of tower 53 passing off through line 59 to defluorinator 60, thence to conventional deisobutanizer and rerun towers not shown.

The vapors separated from the hydrocarbon effluent in the flash drum 43 pass off through line 61 to condenser 62 after which the condensate is collected in effluent flash accumulator 63. Condensate in accumulator 63 is recycled to feed pipe 14 through pipe 64, pump 65 and pipe 66.

The effluent flash drum 43 is operated at a pressure in the order of 15 to 25 p.s.i.a. when the reactor is held at 50° F. The vapors leaving flash drum 43 pass to condenser 62 and accumulator 63 which are operated at approximately the same pressure.

Cooling medium at the condenser 62 is provided by a closed cycle refrigeration system such as, for example, one utilizing Freon 12 or propane. This refrigeration system includes heat transfer coil 62a in condenser 62, connected to compressor 68 by line 67, a line 69 leading from the compressor 68 to a condenser 70 and pipe 71 connecting the condenser to receiver 72. A pipe 71 completes the closed cycle connecting receiver 72 with transfer coil 62a. This refrigeration system is operated to provide a condensing temperature in the order of 15° F. It will be noted that the refrigeration system is operated as a closed cycle so that none of the refrigerant comes in contact with the hydrocarbons being processed or the hydrogen fluoride catalyst. Even more important, none of the hydrogen fluoride comes in contact with the compressor.

By means of this refrigeration system effluent vapors withdrawn from flash drum 43 are condensed and their temperature is reduced commensurate with the temperatures of the circulating refrigerant. Under normal operating conditions condensate collected in accumulator 63 will have a temperature of approximately 15° to 25° F. The quantity of isobutane in this condensate stream recycled through pipe 66 will normally be in the order of 4 to 7 parts by volume for each part of olefin in the fresh feed. The overhead from the deisobutanizer 53 can thus be reduced by this same amount for any given condition of fixed quality and rerun yield of alkylate, or it follows if the deisobutanizer 53 remains fixed, the concentration of isobutane in the reactor is considerably increased by the condensed vapors from this source, resulting in increased quality and yield of alkylate.

Although the invention has been described in connection with hydrofluoric acid alkylation with reactor temperatures in the order of 50° F., it should be understood that the reactor may be operated at more elevated temperatures since in many cases alkylation units are operated with reactor temperatures of 60–70° F. or even as high as 100° F. In such cases, the effluent flash drum can be operated at higher temperatures and pressures and still provide satisfactory temperature difference between the refrigerating medium and chilled effluent. For the transfer of heat in such cases the closed cycle refrigeration system can also be operated at higher pressures and still provide satisfactory cooling medium for the flash vapor condenser.

Thus it will be seen that the invention is one well adapted to attain all of the ends and objects hereinabove set forth together with other advantages which are obvious and which are inherent to the process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter hereinabove set forth or shown in the accompanying drawings are to be interpreted as illustrative and not in a limiting sense.

Having thus described my invention, I claim:

1. A process of alkylating isoparaffinic hydrocarbons with olefinic hydrocarbons employing hydrogen fluoride as a catalyst, comprising the steps of contacting isoparaffinic hydrocarbons and olefinic hydrocarbons with liquid hydrogen fluoride catalyst in a reaction step, withdrawing a mixture of hydrocarbons with hydrogen fluoride catalyst as effluent from said reaction step, separating said effluent into a hydrogen fluoride contaminated hydrocarbon phase and an acid phase in a first separating step, said reaction step and first separating step maintained under sufficient pressure to maintain the hydrocarbons in liquid form, reducing the pressure on the hydrogen fluoride contaminated hydrocarbon phase from said first separating step in an evaporative cooling step, passing the pressure reduced hydrogen fluoride contaminated hydrocarbon phase to a relatively low temperature and low pressure vapor withdrawal step, and passing at least a sufficient quantity of some portion of said hydrocarbon phase after pressure reduction thereof in indirect heat exchanging relationship with said reaction step to maintain a temperature level in the said vapor withdrawal step adequate to there establish a flash vaporization equilibrium at which at least substantially all hydrogen fluoride is vaporized from all liquid in the said vapor withdrawal step, and passing hydrogen fluoride-free liquid from the vapor withdrawal step directly to at least one fractionation step for separation of isoparaffinic hydrocarbons from said liquid.

2. A process of alkylating isoparaffinic hydrocarbons with olefinic hydrocarbons employing hydrogen fluoride as a catalyst comprising the steps of contacting isoparaffinic hydrocarbons and olefinic hydrocarbons with liquid hydrogen fluoride catalyst in a reaction step, withdrawing a mixture of hydrocarbons with hydrogen fluoride catalyst as effluent from said reaction step, separating said effluent into a hydrogen fluoride contaminated hydrocarbon phase and an acid phase in a first separating step, said reaction step and first separating step maintained under sufficient pressure to maintain the hydrocarbons and catalyst in liquid form, reducing the pressure on the hydrogen fluoride contaminated hydrocarbon phase from said first separating step in an evaporative cooling step, passing the pressure reduced hydrogen fluoride contaminated hydrocarbon phase to a relatively low temperature and low pressure vapor withdrawal step, establishing a flash vaporization equilibrium in the said vapor withdrawal step with at least substantially all of the hydrogen fluoride vaporized from the liquid in the vapor withdrawal step by transferring a sufficient quantity of heat to the hydrocarbon phase effluent from the reaction step before removal thereof from the vapor withdrawal step to raise the temperature thereof to said flash vaporization equilibrium level, by passing at least a portion of said hydrocarbon phase effluent in indirect heat exchanging relationship with the reaction step and passing hydrogen fluoride-free liquid from the vapor withdrawal step directly to at least one fractionation step for separation of isoparaffinic hydrocarbons from said liquid.

References Cited in the file of this patent
UNITED STATES PATENTS

| | | |
|---|---|---|
| 2,429,205 | Jenny et al. | Oct. 21, 1947 |
| 2,536,515 | Penick | Jan. 2, 1951 |
| 2,664,452 | Putney | Dec. 29, 1953 |